US012798085B2

(12) United States Patent
Li et al.

(10) Patent No.: US 12,798,085 B2
(45) Date of Patent: Nov. 17, 2026

(54) INTELLIGENT GRIPPING METHOD, INTELLIGENT GRIPPING SYSTEM, ELECTRONIC DEVICE, AND STORAGE MEDIUM

(71) Applicants: CHINA TIESIJU CIVIL ENGINEERING GROUP CO., LTD, Hefei (CN); THE FIFTH ENGINEERING CO., LTD OF CHINA TIESIJU CIVIL ENGINEERING GROUP, Jiujiang (CN); GUANGXI NANYU RAILWAY CO., LTD., Nanning (CN)

(72) Inventors: Dingyou Li, Jiujiang (CN); Jinshu Guo, Jiujiang (CN); Lu Wang, Jiujiang (CN); Anqing Yu, Jiujiang (CN); Pinghua Zhu, Jiujiang (CN); Junhong Li, Jiujiang (CN); Minggang Wang, Jiujiang (CN); Chuanqi Zheng, Jiujiang (CN); Di Liu, Jiujiang (CN); Yongxing Sun, Jiujiang (CN)

(73) Assignees: CHINA TIESIJU ENGINEERING GROUP CO., LTD, Hefei (CN); THE FIFITH ENGINEERING CO., LTD OF CHINA TIESIJU CIVIL ENGINEERING GROUP, Jiujiang (CN); GUANGXI NANYU RAILWAY CO., LTD., Nanning (CN)

( * ) Notice: Subject to any disclaimer, the term of this patent is extended or adjusted under 35 U.S.C. 154(b) by 219 days.

(21) Appl. No.: 18/772,262

(22) Filed: Jul. 15, 2024

(65) Prior Publication Data

US 2025/0242488 A1 Jul. 31, 2025

(30) Foreign Application Priority Data

Jan. 30, 2024 (CN) ........................ 202410131896.0

(51) Int. Cl.
*B25J 9/16* (2006.01)
*B25J 13/08* (2006.01)

(52) U.S. Cl.
CPC ............. *B25J 9/1612* (2013.01); *B25J 9/162* (2013.01); *B25J 9/1697* (2013.01); *B25J 13/089* (2013.01)

(58) Field of Classification Search
CPC ........ B25J 9/1612; B25J 9/162; B25J 9/1697; B25J 13/089; G06T 7/85; G06T 7/70; G06T 17/00; G06N 3/006
See application file for complete search history.

(56) References Cited

U.S. PATENT DOCUMENTS

2018/0333855 A1* 11/2018 Moses ...................... B25J 9/162
2020/0073399 A1* 3/2020 Tateno ................. G05D 1/0038
(Continued)

*Primary Examiner* — Adam R Mott
*Assistant Examiner* — Ricardo I Viscarra

(57) ABSTRACT

An intelligent gripping method, an intelligent gripping system, an electronic device, and a storage medium are provided. The intelligent gripping method includes collecting image information of a production line; obtaining point cloud data of the production line based on the image information; processing the point cloud data to obtain spatial poses of reinforced concrete precast components on the production line; establishing a coordinate system of an AGV, obtaining a pose of the AGV, establishing a motion model of the AGV, a sensor observation model, and an odometer model of the AGV; monitoring pose information of the AGV based on the motion model, the sensor observation model, and the odometer model; scheduling the AGV through an artificial bee colony algorithm strategy and the pose information; and enabling the AGV to grip the reinforced concrete precast components based on the spatial poses of the reinforced concrete precast components.

13 Claims, 2 Drawing Sheets

(56) References Cited

U.S. PATENT DOCUMENTS

| | | | | |
|---|---|---|---|---|
| 2020/0333789 | A1* | 10/2020 | Suzuki | G01S 17/89 |
| 2023/0205191 | A1* | 6/2023 | Shao | G05B 19/41895 700/69 |
| 2024/0001550 | A1* | 1/2024 | Li | B25J 9/1664 |
| 2026/0084942 | A1* | 3/2026 | Neighbours | B66F 3/08 |

* cited by examiner

INTELLIGENT GRIPPING METHOD, INTELLIGENT GRIPPING SYSTEM, ELECTRONIC DEVICE, AND STORAGE MEDIUM

TECHNICAL FIELD

The present disclosure relates to a technical field of machine vision processing, and in particular to an intelligent gripping method, an intelligent gripping system, an electronic device, and a storage medium.

BACKGROUND

Reinforced concrete structures are structures made of concrete reinforced with steel bars. Main load-bearing components, such as thin shell structures, large formwork cast-in-place structures, reinforced concrete structures built using slip forms, rising slabs, etc., of building are constructed of the reinforced concrete. The reinforced concrete structures are a structure made from the steel bars and concrete, where the steel bars bear tension and the concrete bears pressure. Therefore, the reinforced concrete structures have advantages of being strong, durable, good in fire resistance, saving steel, and lower in cost than steel structures.

In order to speed up a construction period and ensure project quality and safety, reinforced concrete precast components are widely used, and there are many types of reinforced concrete precast components in different sizes.

In the prior art, after small-sized reinforced concrete precast components are produced, they need to be grabbed and placed at a predetermined location. When gripping the small-sized reinforced concrete precast components, a worker needs to operate a robot to grab the small-sized reinforced concrete precast components and place the small-sized reinforced concrete precast components in the predetermined location. Such method not only reduces griping efficiency, but also increases a workload of the worker. In addition, during a gripping process, grasping of the small-sized reinforced concrete precast components by the robot is not accurate enough.

SUMMARY

In view of this, a purpose of the present disclosure is to provide an intelligent gripping method, an intelligent gripping system, an electronic device, and a storage medium to solve defects in the prior art.

In a first aspect, the present disclosure provides an intelligent gripping method. The intelligent gripping method comprises steps:

- collecting image information of a production line, and obtaining point cloud data of the production line based on the image information;
- processing the point cloud data of the production line, and obtaining spatial poses of reinforced concrete precast components on the production line based on processed point cloud data;
- establishing a coordinate system of an automated guided vehicle (AGV), and obtaining a pose of the AGV based on the coordinate system of the AGV; wherein the coordinate system of the AGV comprises a world coordinate system of the AGV, a vehicle body coordinate system, and a sensor coordinate system;
- establishing a motion model of the AGV based on the pose of the AGV and the world coordinate system of the AGV, establishing a sensor observation model of the AGV based on the sensor coordinate system, and establishing an odometer model of the AGV based on the vehicle body coordinate system;
- monitoring pose information of the AGV based on the motion model, the sensor observation model, and the odometer model; and
- scheduling the AGV through an artificial bee colony algorithm strategy and the pose information, and enabling the AGV to grip the reinforced concrete precast components based on the spatial poses of the reinforced concrete precast components.

Compared with the prior art, in the present disclosure, the spatial poses of the reinforced concrete precast components are obtained through the point cloud data of the production line. Then, by establishing the coordinate system of the AGV and monitoring the pose information of the AGV, and by scheduling the AGV through the artificial bee colony algorithm strategy, the AGV is able to accurately grip the reinforced concrete precast components according to the spatial poses of the reinforced concrete precast components, which not only improves an accuracy of griping, but also effectively improves griping efficiency and reduces a workload of a worker.

Furthermore, the step of collecting the image information of the production line and obtaining the point cloud data of the production line based on the image information comprises steps:

- collecting the image information of the production line by a 3-dimension (3D) camera;
- extracting coordinates of points of the reinforced concrete precast components in the image information according to coordinates in the 3D camera; and
- obtaining the point cloud data of the production line according to the coordinates of the points.

Furthermore, the step of processing the point cloud data of the production line and obtaining the spatial poses of the reinforced concrete precast components on the production line based on the processed point cloud data comprises steps;

- cleaning, denoising, and filtering the point cloud data of the production line in sequence to obtain point cloud data of the reinforced concrete precast components; and
- generating the spatial poses of the reinforced concrete precast components based on the point cloud data of the reinforced concrete precast components.

The intelligent gripping method according to claim 1, wherein the step of establishing the motion model of the AGV based on the pose of the AGV and the world coordinate system of the AGV comprises steps:

- obtaining the pose of the AGV at time k, and obtaining wheel parameters of the AGV and system inputs in the AGV; and
- establishing the motion model of the AGV based on the pose of the AGV at the time k, the wheel parameters, and the system inputs in the AGV.

Furthermore, an expression of the motion model is:

$$x_k = f(x_{k-1}, u_k) + \varepsilon_k.$$

$x_k$ represents the pose of the AGV at the time k, $\varepsilon_k$ represents a system disturbance of the AGV, $f(x_{k-1}, u_k)$ represents a system state transfer function of the AGV, x represents a coordinate parameter in the pose of the AGV at the time k, and $u_k$ represents the system input in the AGV.

Furthermore, the step of establishing the odometer model of the AGV based on the vehicle body coordinate system comprises steps:

obtaining odometer information based on a vehicle body of the AGV, and obtain a speed of the AGV based on the odometer information and by calculating pulses of the AGV per unit time; and establishing the odometer model based on the speed of the AGV.

Furthermore, the step of scheduling the AGV through the artificial bee colony algorithm strategy and the pose information comprises steps:

configuring the reinforced concrete precast components on the production line as honey sources, and initializing the honey sources to obtain initialized honey sources;

searching the initialized honey sources based on automatic generation control to obtain updated honey sources; and calculating a spatial relationship between each of the updated honey sources and the AGC to obtain an optimal honey source; and scheduling the AGV through the optimal honey source.

In a second aspect, the present disclosure provides an intelligent gripping system. The intelligent gripping system comprises a collection module, a processing module, a first establishment module, a second establishment module, a monitoring module, and a scheduling module.

The collection module is configured to collect image information of a production line and obtain point cloud data of the production line based on the image information.

The processing module is configured to process the point cloud data of the production line and obtain spatial poses of reinforced concrete precast components on the production line based on processed point cloud data.

The first establishment module is configured to establish a coordinate system of an AGV and obtain a pose of the AGV based on the coordinate system of the AGV. The coordinate system of the AGV comprises a world coordinate system of the AGV, a vehicle body coordinate system, and a sensor coordinate system.

The second establishment module is configured to establish a motion model of the AGV based on the pose of the AGV and the world coordinate system of the AGV, establish a sensor observation model of the AGV based on the sensor coordinate system, and establish an odometer model of the AGV based on the vehicle body coordinate system.

The monitoring module is configured to monitor pose information of the AGV based on the motion model, the sensor observation model, and the odometer model.

The scheduling module is configured to schedule the AGV through an artificial bee colony algorithm strategy and the pose information, so that the AGV to grip the reinforced concrete precast components based on the spatial poses of the reinforced concrete precast components.

In a third aspect, the present disclosure provides an electronic device. The electronic device comprises a memory, a processor, and computer programs stored in the memory and executable on the processor. The processor executes the computer programs to implement the intelligent gripping method mentioned above.

In a fourth aspect, the present disclosure provides a storage medium. The storage medium comprises computer programs stored therein. When the computer program are executed by a processor, the intelligent gripping method mentioned above is implemented.

REFERENCE NUMBERS IN THE DRAWINGS

10. collection module; 20. processing module; 30. first establishment module; 40. second establishment module; 50. monitoring module; 60. scheduling module; 70. bus; 71. processor; 72. memory; 73. communication interface.

The present disclosure is further illustrated through following specific embodiments in conjunction with the accompany drawings.

DETAILED DESCRIPTION

For ease of understanding the present disclosure, the present disclosure is described fully hereinafter with reference to the accompanying drawings. Several embodiments of the present disclosure are given in the accompanying drawings. However, the present disclosure may be implemented in many different forms and is not limited to the embodiments described herein. On the contrary, a purpose of providing these embodiments is to make the disclosure of the present disclosure more thorough and comprehensive.

It should be noted that when an element is referred to as being "fixed to" another element, it may be directly fixed to another element or indirectly fixed to another element through intervening elements. When the element is considered to be "connected" to another element, it may be directly connected to another element or intervening elements may be present at the same time. The terms "vertical", "horizontal", "left", "right", and the like, as used herein, are for illustrative purposes only.

Unless otherwise defined, all technical and scientific terms used herein have the same meaning as commonly understood by those skilled in the art of the present disclosure. The terms used in the specification of the present disclosure are only for the purpose of describing specific embodiments, and are not intended to limit the present disclosure. As used herein, the term "and/or" includes all combinations including one or more of associated listed items.

Figure 1:
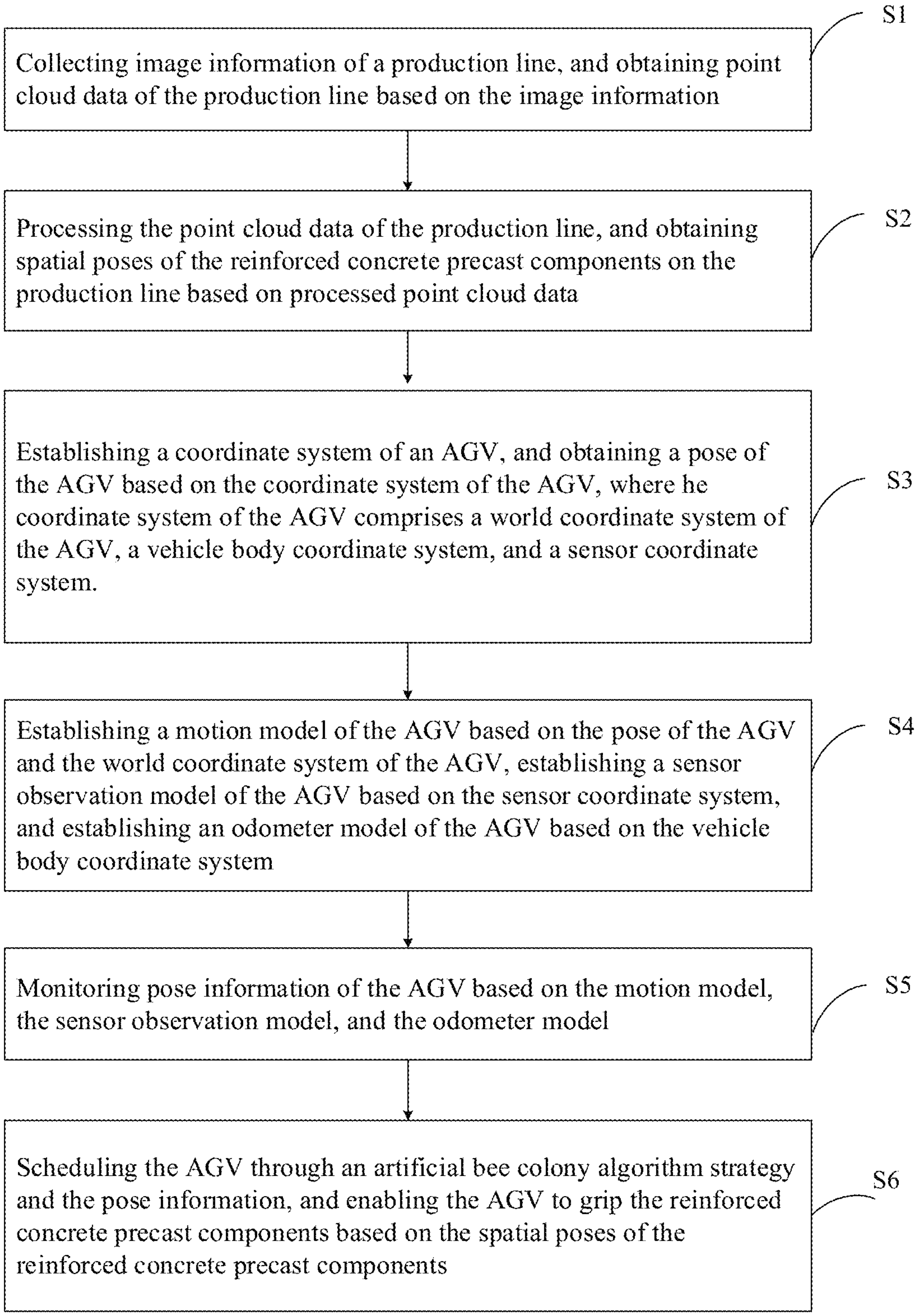
FIG. 1 is a flow chart of an intelligent gripping method according to a first embodiment of the present disclosure.

As shown in FIG. 1, the present disclosure provides an intelligent gripping method. The intelligent gripping method comprises steps S1-S6.

The step S1 comprises collecting image information of a production line and obtaining point cloud data on the production line based on the image information.

Specifically, the step S1 comprises steps A11-S13.

The step S11 comprises collecting the image information of the production line by a 3-dimension (3D) camera;

It should be understood that in one specific embodiment, the 3D camera is calibrated first, and then the image information of the production line is collected through the 3D camera. In the embodiment, the image information comprises images of the production line and images of the reinforced concrete precast components on the production line.

The step S12 comprises extracting coordinates of points of the reinforced concrete precast components in the image information according to coordinates in the 3D camera.

It should be understood that the 3D camera is able to collect a pose of the production line and the spacial poses of the reinforced concrete precast components on the production line, and the coordinates of the points in the image information are extracted from the image information collected by the 3D camera.

In the embodiment, the pose of the production line refers to a position and a posture of the production line, and the spacial poses of the reinforced concrete precast components refer to positions and postures of the reinforced concrete precast components.

The step S13 comprises obtaining the point cloud data of the production line according to the coordinates of the points.

It is understood that the point cloud data of the production line and point cloud data of the reinforced concrete precast components are obtained according to the coordinates of the points.

The step S2 comprises processing the point cloud data of the production line, and obtaining spatial poses of reinforced concrete precast components on the production line based on processed point cloud data.

Specifically, the step S2 comprises steps S21-S22.

The step S21 comprises cleaning, denoising, and filtering the point cloud data of the production line in sequence to obtain point cloud data of the reinforced concrete precast components.

It is understood that the point cloud data of the production line is cleaned to make the point cloud data of the reinforced concrete precast components clearer, and effective point cloud data of the reinforced concrete precast components are obtained through denoising and filtering.

The step S22 comprises generating the spatial poses of the reinforced concrete precast components based on the point cloud data of the reinforced concrete precast components.

It is understood that the spatial poses of the reinforced concrete precast components are generated through the effective point cloud data of the reinforced concrete precast components, that is, spatial positions of the reinforced concrete precast components on the production line.

The step S3 comprises establishing a coordinate system of an automated guided vehicle (AGV), and obtaining a pose of the AGV based on the coordinate system of the AGV. The coordinate system of the AGV comprises a world coordinate system of the AGV, a vehicle body coordinate system, and a sensor coordinate system.

It should be noted that the AGV is the automatic transport vehicle. By establishing the coordinate system of the AGV in space, the pose of the AGV in space is defined based on the coordinate system of the AGV in space. In the embodiment, the coordinate system of the AGV comprises the world coordinate system of the AGV, the vehicle body coordinate system, and the sensor coordinate system. Specifically, the world coordinate system of the AGV is specific coordinates of the AGV in space, the vehicle body coordinate system is coordinates of a vehicle body of the AGV, and the sensor coordinate system is coordinates of a sensor on the AGV.

The step S4 comprises establishing a motion model of the AGV based on the pose of the AGV and the world coordinate system of the AGV, establishing a sensor observation model of the AGV based on the sensor coordinate system, and establishing an odometer model of the AGV based on the vehicle body coordinate system.

It is understood that the motion model of the AGV is established through the pose of the AGV in the space and the world coordinate system of the AGV, the sensor observation model is established through the sensor coordinate system of the AGV, and the odometer model of the AGV is established through the vehicle body coordinate system.

Specifically, the step S4 comprises steps S41-S44.

The step S41 comprises obtaining the pose of the AGV at time k, and obtaining wheel parameters of the AGV and system inputs in the AGV.

The step S42 comprises establishing the motion model of the AGV based on the pose of the AGV at the time k, the wheel parameters, and the system inputs in the AGV.

It should be noted that an expression of the motion model is:

$$x_k = f(x_{k-1}, u_k) + \varepsilon_k.$$

$x_k$ represents the pose of the AGV at the time k, $\varepsilon_k$ represents a system disturbance of the AGV, $f(x_{k-1}, u_k)$ represents a system state transfer function of the AGV, x represents a coordinate parameter in the pose of the AGV at the time k, and $u_k$ represents the system input in the AGV.

The step S43 comprises obtaining odometer information based on a vehicle body of the AGV, and obtain a speed of the AGV based on the odometer information and by calculating pulses of the AGV per unit time.

The step S44 comprises establishing the odometer model based on the speed of the AGV.

It should be noted that the odometer information on the on the vehicle body of the AGV is obtained from encoder information on a driving wheel of the vehicle body. By calculating the pulses per unit time, a speed of the driving wheel of the vehicle body is obtained, and then the speed of the driving wheels of the vehicle body is obtained, thereby obtaining a movement distance of the AGV and a change of the pose of the AGV.

The step S5 comprises monitoring pose information of the AGV based on the motion model, the sensor observation model, and the odometer model.

It is understood that by establishing the coordinate system of the AGV, the motion model, the odometer model, and the sensor observation model, pose information during the movement of the AGV and a transfer process of the AGV is accurately controlled. Further, the sensor observation model is configured to monitor surrounding conditions of the AGV in real time to ensure safety of the transfer process. Furthermore, the pose of the AGV is also important information for collaboration with an industrial robot. If the pose information deviates greatly, the industrial robot may easily misjudge a status, resulting in safety hazards or malfunctions and stagnation.

The step S6 comprises scheduling the AGV through an artificial bee colony algorithm strategy and the pose information, and enabling the AGV to grip the reinforced concrete precast components based on the spatial poses of the reinforced concrete precast components.

Specifically, the step S6 comprises S61-S63.

The step S61 comprises configuring the reinforced concrete precast components on the production line as honey sources, and initializing the honey sources to obtain initialized honey sources.

The step S62 comprises searching the initialized honey sources based on automatic generation control to obtain updated honey sources; and calculating a spatial relationship between each of the updated honey sources and the AGC to obtain an optimal honey source.

The step S63 comprises scheduling the AGV through the optimal honey source.

It is understood that there are a plurality of AGVs, and the plurality of AGVs are served as a bee colony and the reinforced concrete precast components on the production line are served as the honey sources, one of the AGVs (the AGV mentioned above) is able to grip one of the reinforced concrete precast components with a best path closest to the one of the AGVs when being scheduled. That is, the one of the AGVs is scheduled according to the optimal honey source, so that the AGVs are able to grip the reinforced concrete precast components. In the present disclosure, the implement of a single AGV is illustrated for ease of understanding of the present disclosure, and it is understood that the intelligent gripping method is able to schedule the plurality of AGVs at the same time.

It is worth mentioning that hollow portions of the reinforced concrete prefabricated components are served as mark points, so the any of the AGVs is able to automatically align with a pallet. Any one the AGVs may comprise grips configured to grip the reinforced concrete prefabricated components, so that any one of the AGVs is allowed to grip a plurality of target components at the same time.

In summary, in the present disclosure, the spatial poses of the reinforced concrete precast components are obtained through the point cloud data of the production line. Then, by establishing the coordinate system of the AGV and monitoring the pose information of the AGV, and by scheduling the AGV through the artificial bee colony algorithm strategy, the AGV is able to accurately grip the reinforced concrete precast components according to the spatial poses of the reinforced concrete precast components, which not only improves an accuracy of griping, but also effectively improves griping efficiency and reduces a workload of a worker.

Embodiment 2

Figure 2:
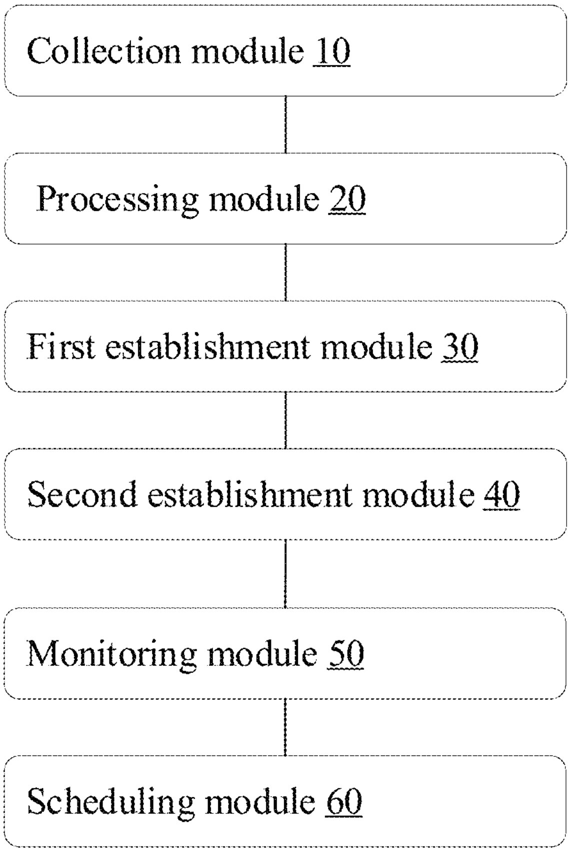
FIG. 2 is a structural block diagram of an intelligent griping system according to a second embodiment of the present disclosure.

In a second aspect, the present disclosure provides an intelligent gripping system. As shown in FIG. 2, the intelligent gripping system comprises a collection module 10, a processing module 20, a first establishment module 30, a second establishment module 40, a monitoring module 50, and a scheduling module 60.

The collection module 10 is configured to collect image information of a production line and obtain point cloud data of the production line based on the image information.

The processing module 20 is configured to process the point cloud data of the production line and obtain spatial poses of reinforced concrete precast components on the production line based on processed point cloud data.

The first establishment module 30 is configured to establish a coordinate system of an AGV and obtain a pose of the AGV based on the coordinate system of the AGV. The coordinate system of the AGV comprises a world coordinate system of the AGV, a vehicle body coordinate system, and a sensor coordinate system.

The second establishment module 40 is configured to establish a motion model of the AGV based on the pose of the AGV and the world coordinate system of the AGV, establish a sensor observation model of the AGV based on the sensor coordinate system, and establish an odometer model of the AGV based on the vehicle body coordinate system.

The monitoring module 50 is configured to monitor pose information of the AGV based on the motion model, the sensor observation model, and the odometer model.

The scheduling module 60 is configured to schedule the AGV through an artificial bee colony algorithm strategy and the pose information, so that the AGV to grip the reinforced concrete precast components based on the spatial poses of the reinforced concrete precast components.

In some optional embodiments, the collection module 10 comprises a collection unit, an extraction unit, and a first obtaining unit.

The collection unit is configured to collect the image information of the production line by a 3D camera.

The extraction unit is configured to extract coordinates of points of the reinforced concrete precast components in the image information according to coordinates in the 3D camera.

The first obtaining unit is configured to obtain the point cloud data of the production line according to the coordinates of the points.

In some optional embodiments, the processing module 20 comprises a processing unit and a generation unit.

The processing unit is configured to clean, denoise, and filter the point cloud data of the production line in sequence to obtain point cloud data of the reinforced concrete precast components.

The generation unit is configured to generate the spatial poses of the reinforced concrete precast components based on the point cloud data of the reinforced concrete precast components.

In some optional embodiments, the second establishment module 40 comprises a second obtaining unit, a construction unit, a calculation unit, and an establishment unit.

The second obtaining unit is configured to obtain the pose of the AGV at time k, and obtain wheel parameters of the AGV and system inputs in the AGV.

The construction unit is configured to establish the motion model of the AGV based on the pose of the AGV at the time k, the wheel parameters, and the system inputs in the AGV.

An expression of the motion model is:

$$x_k = f(x_{k-1}, u_k) + \varepsilon_k.$$

$x_k$ represents the pose of the AGV at the time k, $\varepsilon_k$ represents a system disturbance of the AGV, $f(x_{k-1}, u_k)$ represents a system state transfer function of the AGV, x represents a coordinate parameter in the pose of the AGV at the time k, and $u_k$ represents the system input in the AGV.

The calculation unit is configured to obtain odometer information based on a vehicle body of the AGV, and obtain a speed of the AGV based on the odometer information and by calculating pulses of the AGV per unit time.

The establishment unit is configured to establish the odometer model based on the speed of the AGV.

In some embodiments, the scheduling module 60 comprises an initialization unit, an update calculation unit, and a scheduling unit, The initialization unit is configured to define the reinforced concrete precast components on the production line as honey sources and initialize the honey sources to obtain initialized honey sources.

The update calculation unit is configured to search the initialized honey sources based on automatic generation control to obtain updated honey sources; and is configured to calculate a spatial relationship between each of the updated honey sources and the AGC to obtain an optimal honey source.

The scheduling unit is configured to schedule the AGV through the optimal honey source.

Functions or operation steps implemented when each of the above modules and units are executed are substantially the same as those in the above method embodiments, which are not repeatedly described herein.

The implementation principles and technical effects of the intelligent griping system provided by the embodiments of the present disclosure are the same as those of the foregoing embodiments of the intelligent griping method. For brief description. matters not mentioned in the embodiments of the intelligent system, please refer to the corresponding content in the foregoing embodiments of the intelligent griping method.

Embodiment 3

Figure 3:
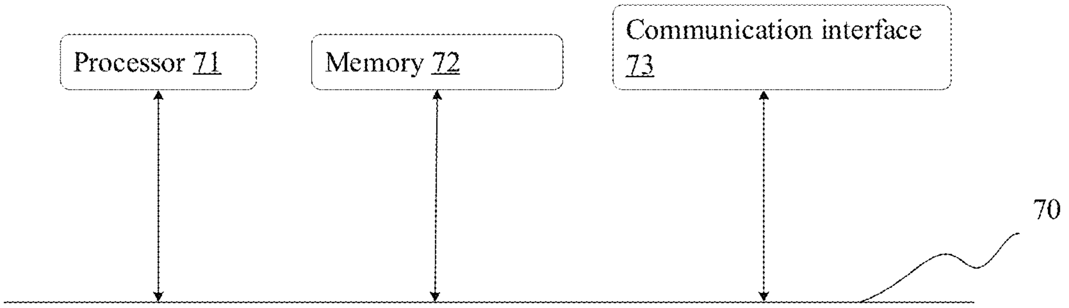
FIG. 3 is a schematic diagram of an electronic device according to a third embodiment of the present disclosure.

The intelligent gripping method shown in FIG. 1 is realized by an electronic device. FIG. 3 is a schematic diagram of the electronic device of the present disclosure.

The electronic device comprises a memory 72, a processor 71, and computer programs stored in the memory 72.

Specifically, the processor 71 may be a central processing unit (CPU), or an application specific integrated circuit (ASIC), or may be configured as one or more integrated circuits of the present disclosure.

The memory 72 may comprise bulk storage for data or instructions. In one optional embodiment, the memory 72 is a hard disk drive (HDD), a floppy disk drive, a solid state drive (SSD), a flash memory, an optical disk, a magneto-optical disk, a magnetic tape, or a universal serial drive. (USB) driver or a combination of two or more of them. In some embodiments, the memory 72 comprises removable or non-removable (or fixed) media. In some embodiments, the memory 72 may be disposed in or outside a data processing device. In one specific embodiment, the memory 72 is Non-Volatile memory. In one specific embodiment, the memory 72 is a read-only memory (ROM) or a random access memory (RAM).

Under appropriate circumstances, the ROM may be a mask-programmed ROM, a programmable ROM (PROM), an erasable PROM (EPROM), an electrically removable ROM, an electrically erasable PROM (EEPROM), an electrically alterable ROM (EAROM), a flash memory (FLASH), or a combination of two or more of these.

Under appropriate circumstances, the RAM may be a static RAM (SRAM) or a dynamic random access memory (DRAM). The DRAM may be a fast page mode dynamic random access memory (FPMDRAM), an extended data output dynamic random access memory (EDODRAM), a synchronous dynamic random access memory (SDRAM), etc.

The memory 72 is configured to store or cache various data files that need to be processed and/or communicated, as well as possible computer programs executed by the processor 71.

The processor 71 reads and executes the computer programs stored in the memory 72 to implement the intelligent griping method of the first embodiment.

In some embodiments, the electronic device further comprises a communication interface 73 and a bus 70. As shown in FIG. 3, the processor 71, the memory 72, and the communication interface 73 are connected and communicated through the bus 70.

The communication interface 73 is configured to realize communications between various modules, devices, units and/or equipment in the present disclosure. The communication interface 73 further realizes data communication with other components such as: an external device, an image/data acquisition device, a database, an external storage, an image/data processing workstation, etc. The bus 70 comprises hardware, software, or both, and is configured to couple components of the electronic device to each other. The bus 70 may be a data bus, an address bus, a control bus, an expansion bus, a local bus, etc. For example, the bus 70 may be an accelerated graphics port (AGP) bus, other graphics bus, an extended industry standard architecture (EISA) bus, a front side bus (FSB), a hyper transport (HT) interconnect bus, an industry standard architecture (ISA) bus, InfiniBand interconnect bus, a low pin count (LPC) bus, a memory bus, a micro channel architecture (MCA) bus, a peripheral component interconnect (PCI) bus, a PCI-Express (PCI-X) bus, a serial advanced technology attachment (SATA) bus, a video electronics standards association local bus (VLB), other suitable buses, or a combination of two or more of these.

Where appropriate, the bus 70 may comprise one or more buses. Although the present disclosure describes and illustrates a particular bus, any suitable bus or interconnection may also be adopted.

The electronic device comprises the intelligent griping system and execute the intelligent griping method of the first embodiment.

In addition, combined with the intelligent griping method of the first embodiment, the present disclosure provides a storage medium. The storage medium comprises the computer programs stored therein. When the computer program are executed by a processor, the intelligent gripping method mentioned above is implemented.

In the description of the present disclosure, the description of reference terms “one embodiment”, “some embodiments”, “examples”, “particular examples”, “some examples”, etc. mean that particular features, structures, materials, or characteristics described in connection with the embodiments or examples are included in at least one embodiment or example of the present disclosure. In the specification, schematic representations of the above terms do not necessarily refer to the same embodiment or example. Furthermore, the specific features, structures, materials or characteristics described may be combined in any suitable manner in any one or more embodiments or examples.

The above-mentioned embodiments only represent some embodiments of the present disclosure. The descriptions thereof are specific and detailed, but should not be construed as a limitation of the scope of the present disclosure. It should be pointed out that for those of ordinary skill in the art, without departing from the concept of the present disclosure, modifications and improvements can be made. The modifications and the improvements belong to the protection scope of the present disclosure. Therefore, the protection scope of the present disclosure should be subject to the attached claims.

What is claimed is:

1. An intelligent gripping method, comprising steps:

collecting image information of a production line, and obtaining point cloud data of the production line based on the image information;

processing the point cloud data of the production line, and obtaining spatial poses of the reinforced concrete precast components on the production line based on processed point cloud data;

establishing a coordinate system of an automated guided vehicle (AGV), and obtaining a pose of the AGV based on the coordinate system of the AGV; wherein the coordinate system of the AGV comprises a world coordinate system of the AGV, a vehicle body coordinate system, and a sensor coordinate system;

establishing a motion model of the AGV based on the pose of the AGV and the world coordinate system of the AGV, establishing a sensor observation model of the AGV based on the sensor coordinate system, and establishing an odometer model of the AGV based on the vehicle body coordinate system;

monitoring pose information of the AGV based on the motion model, the sensor observation model, and the odometer model; and moving the AGV along an optimal path to the location of the reinforced concrete precast component based on the monitored pose information;

automatically identifying hollow portions of the reinforced concrete precast component as alignment mark points, and controlling the AGV to adjust its position to align a gripper of the AGV with the identified alignment mark points; and actuating the gripper of the AGV to simultaneously grip a plurality of reinforced concrete precast components and place the gripped components onto a predetermined pallet location.

2. The intelligent gripping method according to claim 1, wherein the step of collecting the image information of the production line and obtaining the point cloud data of the production line based on the image information comprises steps:

collecting the image information of the production line by a 3-dimension (3D) camera;

extracting coordinates of points of the reinforced concrete precast components in the image information according to coordinates in the 3D camera; and obtaining the point cloud data of the production line according to the coordinates of the points.

3. The intelligent gripping method according to claim 1, wherein the step of processing the point cloud data of the production line and obtaining the spatial poses of the reinforced concrete precast components on the production line based on the processed point cloud data comprises steps;

cleaning, denoising, and filtering the point cloud data of the production line in sequence to obtain point cloud data of the reinforced concrete precast components; and generating the spatial poses of the reinforced concrete precast components based on the point cloud data of the reinforced concrete precast components.

4. The intelligent gripping method according to claim 1, wherein the step of establishing the motion model of the AGV based on the pose of the AGV and the world coordinate system of the AGV comprises steps:

obtaining the pose of the AGV at time k, and obtaining wheel parameters of the AGV and system inputs in the AGV; and establishing the motion model of the AGV based on the pose of the AGV at the time k, the wheel parameters, and the system inputs in the AGV.

5. The intelligent gripping method according to claim 4, wherein an expression of the motion model is:

$$x_k = f(x_{k-1}, u_k) + \varepsilon_k$$

wherein $x_k$ represents the pose of the AGV at the time k; $\varepsilon_k$ represents a system disturbance of the AGV; $f(x_{k-1}, u_k)$ represents a system state transfer function of the AGV; x represents a coordinate parameter in the pose of the AGV at the time k; $u_k$ represents the system input in the AGV.

6. The intelligent gripping method according to claim 1, wherein the step of establishing the odometer model of the AGV based on the vehicle body coordinate system comprises steps:

obtaining odometer information based on a vehicle body of the AGV, and obtain a speed of the AGV based on the odometer information and by calculating pulses of the AGV per unit time; and establishing the odometer model based on the speed of the AGV.

7. The intelligent gripping method according to claim 1, wherein the step of scheduling the AGV through the artificial bee colony algorithm strategy and the pose information comprises steps:

configuring the reinforced concrete precast components on the production line as honey sources, and initializing the honey sources to obtain initialized honey sources;

searching the initialized honey sources based on automatic generation control to obtain updated honey sources; and calculating a spatial relationship between each of the updated honey sources and the AGC to obtain an optimal honey source; and scheduling the AGV through the optimal honey source.

8. An intelligent gripping system, comprising: a collection module, a processing module, a first establishment module, a second establishment module, a monitoring module, and a scheduling module;

wherein the collection module is configured to collect image information of a production line and obtain point cloud data of the production line based on the image information;

the processing module is configured to process the point cloud data of the production line and obtain spatial poses of reinforced concrete precast components on the production line based on processed point cloud data;

the first establishment module is configured to establish a coordinate system of an AGV and obtain a pose of the AGV based on the coordinate system of the AGV; wherein the coordinate system of the AGV comprises a world coordinate system of the AGV, a vehicle body coordinate system, and a sensor coordinate system;

the second establishment module is configured to establish a motion model of the AGV based on the pose of the AGV and the world coordinate system of the AGV, establish a sensor observation model of the AGV based on the sensor coordinate system, and establish an odometer model of the AGV based on the vehicle body coordinate system;

the monitoring module is configured to monitor pose information of the AGV based on the motion model, the sensor observation model, and the odometer model;

the scheduling and control module is configured to:

move the AGV along an optimal path to the location of the reinforced concrete precast component based on the monitored pose information;

automatically identify hollow portions of the reinforced concrete precast component as alignment mark points, and control the AGV to adjust its position to align a gripper of the AGV with the identified alignment mark points; and actuate the gripper of the AGV to simultaneously grip a plurality of reinforced concrete precast components and place the gripped components onto a predetermined pallet location.

9. An electronic device, comprising:

a memory, a processor, and computer programs stored in the memory and executable on the processor;

wherein the processor executes the computer programs to implement the intelligent gripping method according to claim 1.

10. The intelligent gripping method according to claim 1, wherein further comprising:

after placing the gripped components onto the predetermined pallet location, recapturing image information of the production line;

verifying that all gripped components have been correctly placed using the recaptured image information; and responsive to verifying correct placement, scheduling the AGV to return to a home position to prepare for the next gripping cycle.

11. The intelligent gripping method according to claim 10, wherein step of verifying that all gripped components have been correctly placed using the recaptured image information comprises comparing the spatial poses of the components on the pallet with predetermined target poses and determining that the placement is correct if the deviation is less than 5 mm.

12. The intelligent gripping system according to claim 8, wherein the intelligent gripping system further comprises:

the collection module is further configured to recapture image information of the production line after placing the gripped components onto the predetermined pallet location;

the processing module is further configured to verify that all gripped components have been correctly placed using the recaptured image information; and the scheduling and control module is further configured to schedule the AGV to return to a home position to prepare for the next gripping cycle responsive to verifying correct placement.

13. The intelligent gripping system according to claim 12, wherein the processing module is configured to compare the spatial poses of the components on the pallet with predetermined target poses and determine that the placement is correct if the deviation is less than 5 mm.

* * * * *